(12) United States Patent
Beecroft

(10) Patent No.: US 10,174,681 B2
(45) Date of Patent: Jan. 8, 2019

(54) GAS BLEED ARRANGEMENT

(71) Applicant: ROLLS-ROYCE plc, London (GB)

(72) Inventor: Peter Beecroft, Derby (GB)

(73) Assignee: ROLLS-ROYCE plc, London (GB)

( * ) Notice: Subject to any disclaimer, the term of this patent is extended or adjusted under 35 U.S.C. 154(b) by 420 days.

(21) Appl. No.: 15/048,401

(22) Filed: Feb. 19, 2016

(65) Prior Publication Data

US 2016/0265442 A1 Sep. 15, 2016

(30) Foreign Application Priority Data

Mar. 10, 2015 (GB) .................................. 1504010.8

(51) Int. Cl.
*F02C 9/18* (2006.01)
*F01D 17/10* (2006.01)

(52) U.S. Cl.
CPC ............... *F02C 9/18* (2013.01); *F01D 17/105* (2013.01)

(58) Field of Classification Search
CPC ...... F02C 9/18; F04D 27/0215; F04D 27/023; F01D 17/085; F01D 17/105; F01D 17/148; F01D 17/10; F01D 17/143; F01D 17/141; F01D 17/12
See application file for complete search history.

(56) References Cited

U.S. PATENT DOCUMENTS

| | | | | |
|---|---|---|---|---|
| 4,329,114 A * | 5/1982 | Johnston | .................. | F01D 11/24 415/116 |
| 5,261,228 A | 11/1993 | Shuba | | |
| 5,279,109 A * | 1/1994 | Liu | .................. | F02C 7/052 60/39.092 |
| 5,531,566 A * | 7/1996 | Derouet | ................. | F01D 17/105 415/144 |
| 8,904,753 B2 * | 12/2014 | Murphy | ................ | F01D 17/085 165/96 |
| 9,518,513 B2 * | 12/2016 | Pritchard, Jr. | ........ | F01D 17/105 |
| 9,982,598 B2 * | 5/2018 | Pritchard, Jr. | .......... | F02C 7/052 |
| 2012/0272658 A1 * | 11/2012 | Murphy | ................ | F01D 17/085 60/783 |

(Continued)

FOREIGN PATENT DOCUMENTS

| | | |
|---|---|---|
| EP | 2 993 310 A1 | 3/2016 |
| GB | 2 259 328 A | 3/1993 |

(Continued)

OTHER PUBLICATIONS

Jul. 11, 2016 Search Report issued in British Patent Application No. 1602905.0.

(Continued)

*Primary Examiner* — Eldon T Brockman
(74) *Attorney, Agent, or Firm* — Oliff PLC

(57) ABSTRACT

A gas bleed arrangement for a gas turbine engine. The gas bleed arrangement includes an annular casing defining a main gas flow path. The annular casing has a plurality of bleed ducts each defining a respective bleed flow path. The arrangement further includes a blocking element having at least one aperture. The blocking element is moveable to align the at least one aperture at least partly between the main gas flow path and at least one of the bleed flow paths to control fluid communication between the main gas flow path and the at least one of the bleed flow paths through the aperture.

20 Claims, 10 Drawing Sheets

(56) References Cited

U.S. PATENT DOCUMENTS

| | | | | |
|---|---|---|---|---|
| 2014/0109589 A1* | 4/2014 | Pritchard, Jr. | .......... | F02K 3/075 60/779 |
| 2014/0245747 A1* | 9/2014 | Pritchard, Jr. | ........ | F01D 17/105 60/782 |
| 2015/0052907 A1* | 2/2015 | Murphy | ................ | F01D 17/085 60/783 |
| 2016/0123237 A1* | 5/2016 | Spagnoletti | ............... | F02C 7/14 60/776 |

FOREIGN PATENT DOCUMENTS

| | | |
|---|---|---|
| GB | 2532899 A | 6/2016 |
| WO | 2015/030907 A1 | 3/2015 |

OTHER PUBLICATIONS

Aug. 13, 2015 Search Report issued in British Patent Application No. 1504010.8.

\* cited by examiner

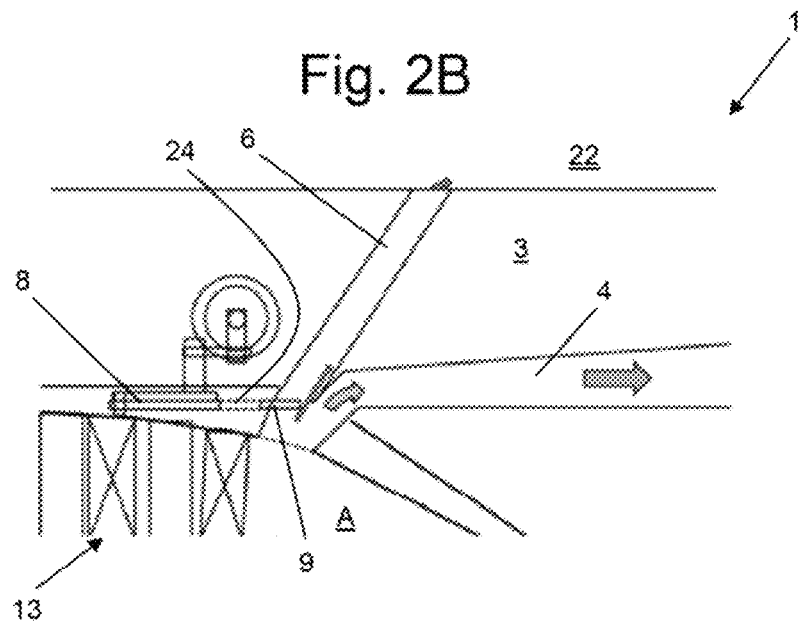
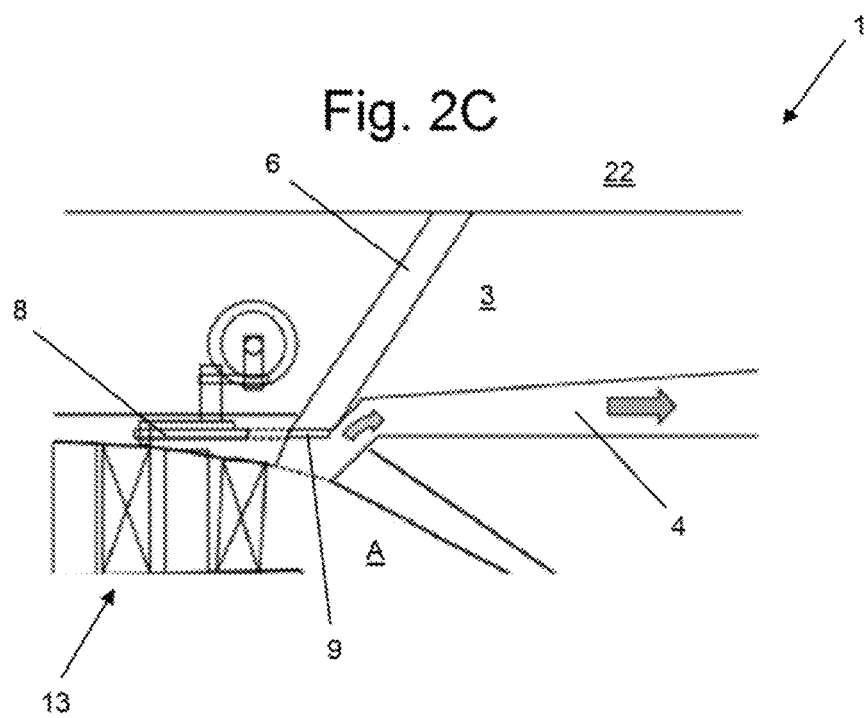

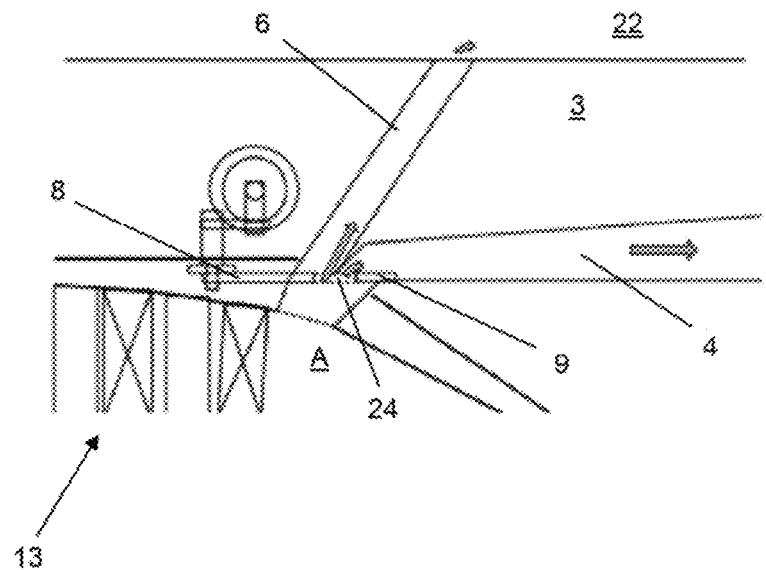
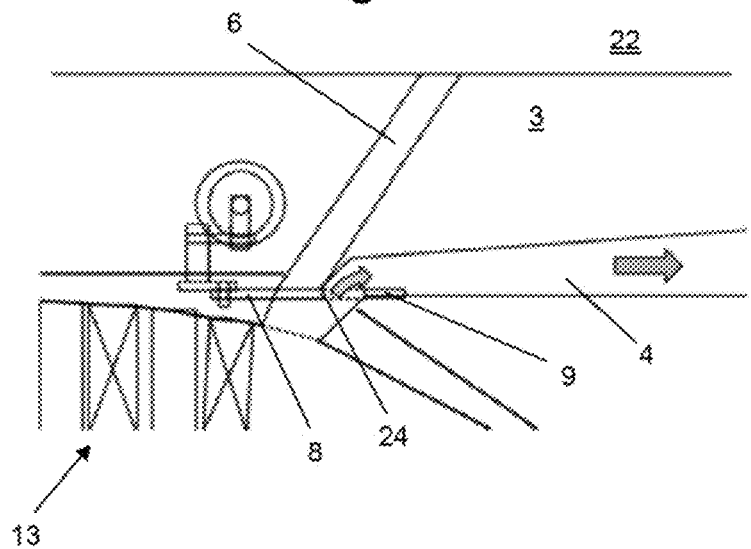

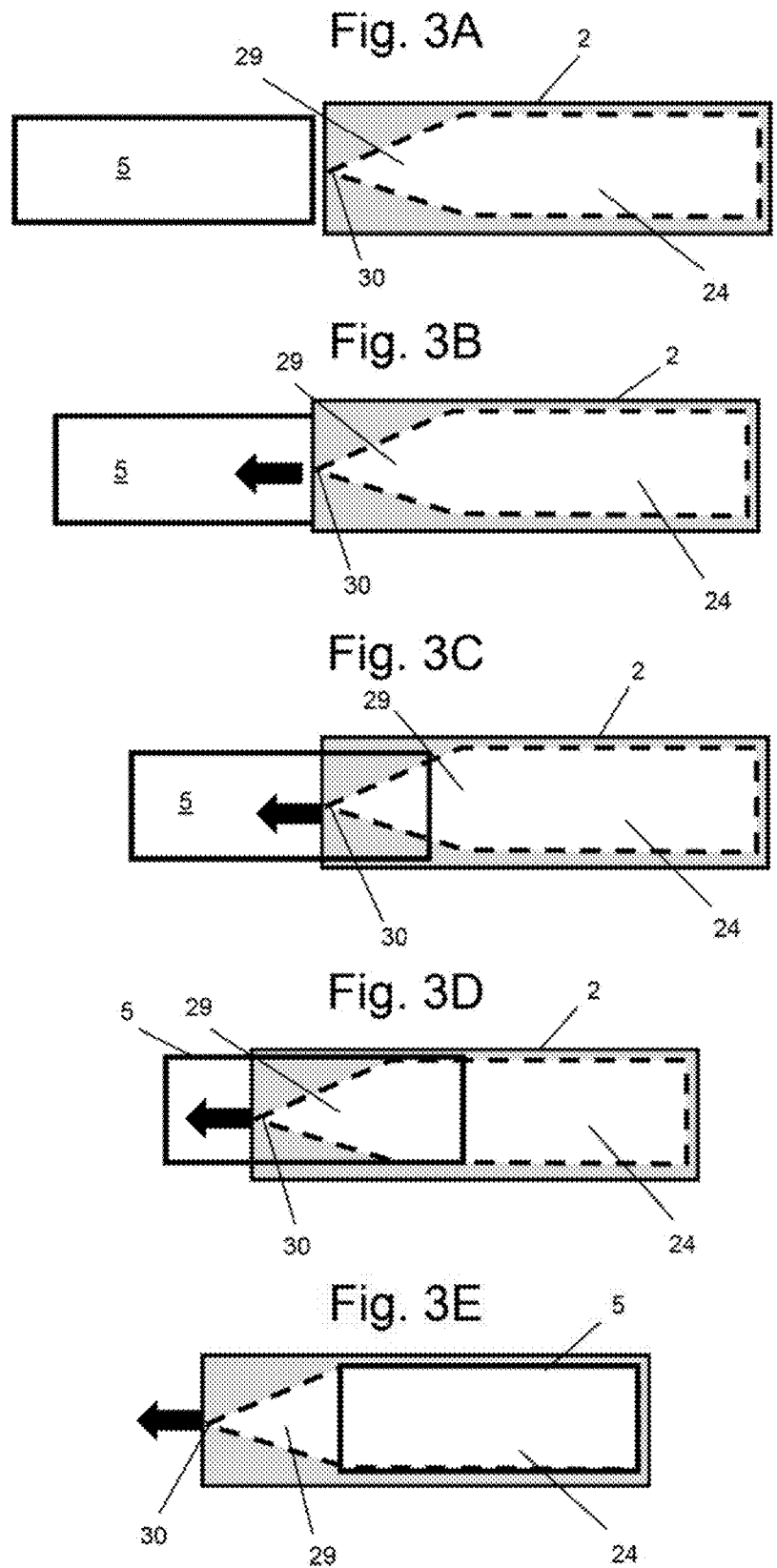

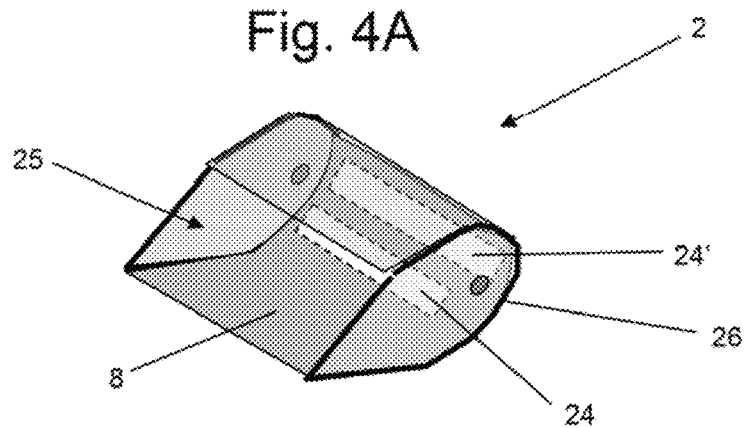
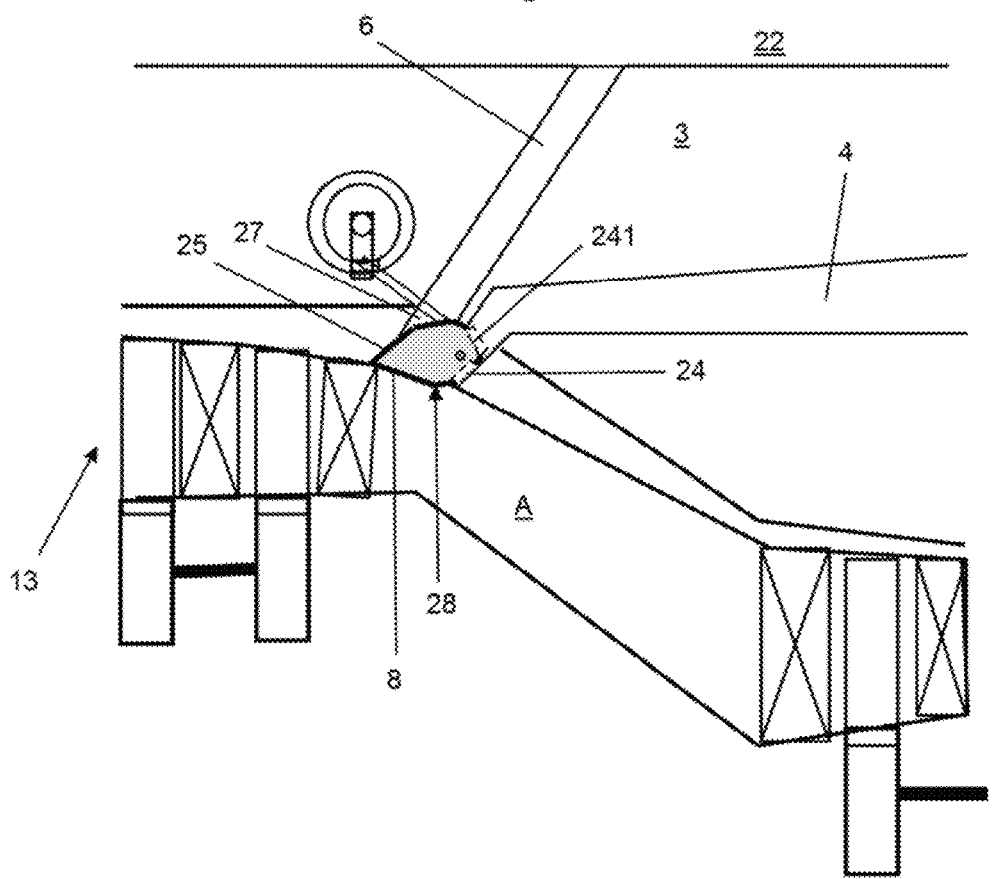

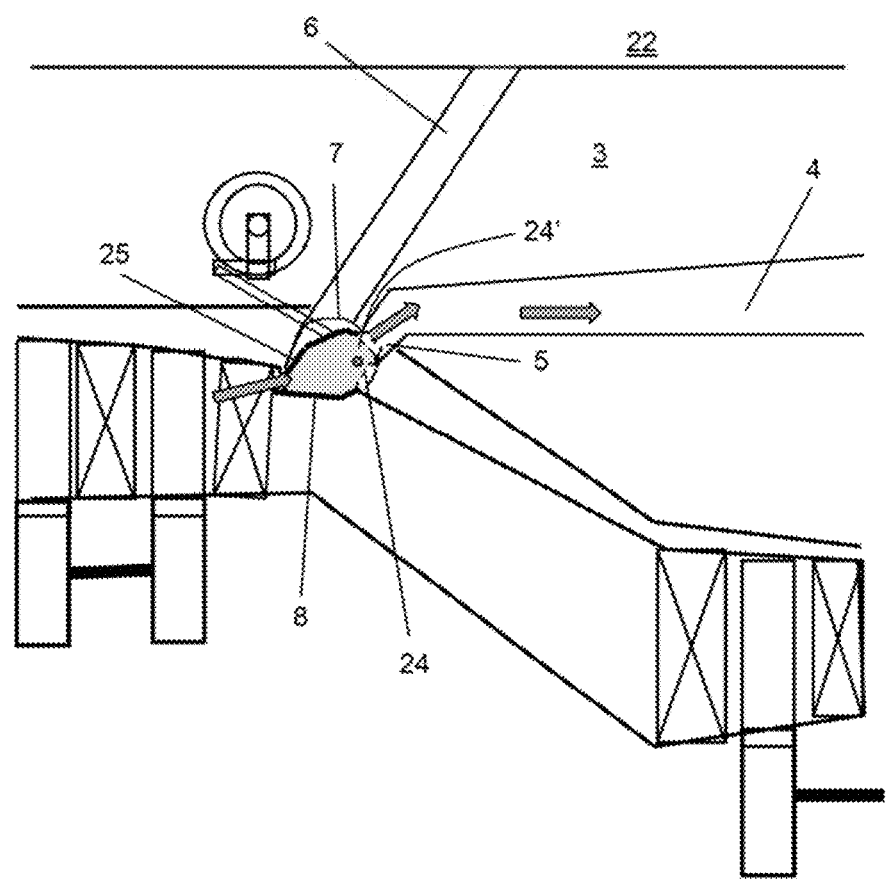

GAS BLEED ARRANGEMENT

FIELD OF THE INVENTION

The present invention relates to a gas bleed arrangement for a gas turbine engine. In particular, the present invention relates to a gas bleed arrangement for controlling the bleed of gas from a main gas flow path to a plurality of engine systems/components.

BACKGROUND OF THE INVENTION

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first (main) air flow A into the intermediate pressure compressor 13 and a second (bypass) air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

It is known to bleed gas through bleed valves from the first air flow A into the bypass duct 22 when the engine is at low power in order to maintain the desired pressure ratio between the Inlet and outlet of the intermediate compressor 13 to avoid engine stalling and/or engine surge. These bleed valves may be binary (i.e. with an open and a closed position) or fully modulated. The fully modulated bleed valves are typically associated with complex feedback control systems and valve actuation mechanisms.

It is also known to source compressed cooling gas from first air flow A before the combustion equipment 15 for feeding to engine systems/components requiring cooling. Often, these engine systems/components require only minimal cooling gas flow at low engine power.

For example, it is known from U.S. Pat. No. 5,261,228 to bleed compressed air from a core duct through a binary bleed valve to the bypass duct and to a clearance control system (at a low rate) in a first mode of operation (with the bleed valve open) and to bleed air from the bypass duct to the clearance control system (at a higher rate) in a second mode of operation (with the bleed valve shut). This arrangement does not allow full modulation of the flow to the clearance control system.

There is a desire to provide a bleed arrangement that allows bleeding of gas from the main gas flow path at a variable flow rate to a number of different engine components/systems without the requirement of a complex actuation mechanism.

SUMMARY OF THE INVENTION

In a first aspect, the present invention provides a gas bleed arrangement for a gas turbine engine, said gas bleed arrangement comprising:
an annular casing defining a main gas flow path, said annular casing having a plurality of bleed ducts each defining a respective bleed flow path;
a blocking element having at least one aperture,
wherein the blocking element is moveable to align the at least one aperture at least partly between the main gas flow path and at least one of the bleed flow paths to control fluid communication between the main gas flow path and the at least one of the bleed flow paths through the aperture.

In this way the flow volume passing to the at least one bleed flow path is variable with respect to the flow volume passing to another of the bleed flow paths.

By providing an annular casing having a plurality of bleed ducts and a blocking element having an aperture, it is possible to control the extent (rate) of gas flow between the main gas flow path and each of the bleed flow paths by selectively aligning the aperture between the main gas flow path and the bleed flow paths. Thus it is possible to ensure that an appropriate gas flow rate (between zero and a maximum rate) is obtained in each of the bleed ducts feeding a plurality of engine systems or components requiring a gas flow.

Optional features of the invention will now be set out. These are applicable singly or in any combination with any aspect of the invention.

In some embodiments, each bleed duct extends from a respective radially inner bleed duct opening. In some embodiments, the radially inner bleed duct openings open into a common duct extending from a radially inner common duct opening through the annular casing from the main gas flow path to the bleed flow paths/ducts.

In some embodiments, the radially inner bleed duct openings all have the same axial dimension. In some embodiments, at least one of the bleed ducts and/or the common duct is annular or a segment of an annulus. In this case the respective radially inner bleed duct/common duct opening is a slot defining an annulus or a segment of an annulus.

In other embodiments, the plurality of bleed ducts and the common duct may be provided at discrete locations around the circumference of the annular casing. The plurality of bleed ducts may be axially off-set from one another.

In some embodiments, the blocking element comprises a main blocking portion dimensioned to fully block the plurality of radially inner bleed duct openings or to fully block the radially inner common duct opening.

In a first, fully closed position, the main blocking portion is completely aligned with the plurality of radially inner bleed duct openings or with the radially inner common duct opening between the main gas flow path and all of the bleed flow paths so that there is no fluid communication between the main gas flow path and the bleed flow paths.

In some embodiments, the blocking element is axially and/or rotatably moveable. In some embodiments, the blocking element is pivotably moveable.

In some embodiments, the blocking element is moveable to move the blocking element from the first, fully closed position with the main blocking portion fully aligned with the radially inner bleed duct openings or the radially inner common duct opening to a second fully open position in which the plurality of bleed ducts are in fluid communication with the main gas flow path.

In some embodiments, the blocking element is moveable (e.g. axially/rotationally or pivotally moveable) from the first (fully closed) position to the second (fully open) position through at least one intermediate position in which in which only one/some of the bleed duct(s) (but not all) is/are in fluid communication with the main gas flow path.

In a first intermediate position, the or one of the at least one apertures is at least partly aligned with one of the radially inner bleed duct openings (whilst the other radially inner bleed duct opening(s) is/are at least partly blocked by the blocking element).

In some embodiments, the blocking element is annular or a segment of an annulus.

In these embodiments, the blocking element comprises the main blocking portion and a secondary blocking portion, the main and secondary blocking portions being spaced by the at least one aperture. In some embodiments, the secondary blocking portion is dimensioned to be smaller than the cross-sectional area of the plurality of radially inner bleed duct openings. For example, the secondary blocking portion may be dimensioned to match the cross-sectional area of one of the plurality of bleed flow paths/radially inner openings.

Where the blocking element is annular or a segment of an annulus, the main blocking portion may be axially and/or circumferentially spaced from the secondary blocking portion by the at least one aperture. For example, the main blocking portion may be axially spaced upstream (i.e. towards the gas intake) from the secondary blocking portion by the at least one aperture.

For the annular/semi-annular blocking element, in the first, fully closed position, there is full alignment between the main blocking portion and the radially inner bleed duct openings so that there is no fluid communication between the main gas flow path and the bleed flow paths.

For the annular/semi-annular blocking element, in the second, fully open position, there is substantially no alignment between the main or secondary blocking portions and the bleed flow paths so that there is unimpeded fluid communication between the main gas flow path and the bleed flow paths. For example, the blocking element may be movable/retractable (e.g. circumferentially moveable or axially retractable) out of alignment with the plurality of bleed ducts/radially inner openings.

For the annular/semi-annular blocking element, in a second intermediate position(s), the secondary blocking portion may at least partly block at least one of the radially inner bleed duct openings.

In some embodiments, the blocking element is a scoop element having a scoop opening which is alignable with the main gas flow path, a main blocking portion extending to a curved surface opposite the scoop opening, the curved surface comprising the at least one aperture.

Where the blocking element is a pivotable scoop element, in the first, fully closed position, the scoop opening is unaligned with the main gas flow path and therefore sealed so that no air from the main gas flow path enters the scoop element.

Where the blocking element is a pivotable scoop element, in the second, fully open position, the scoop opening is fully aligned with/fully open to the main gas flow path and therefore air from the main gas flow path freely enters the scoop element.

Where the blocking element is a pivotable scoop element, in the intermediate position(s), the scoop opening is partly aligned with/partly open to the main gas flow path and therefore a reduced flow air from the main gas flow path enters the scoop element.

Where the blocking element is a pivotable scoop element, there may be at least two apertures provided in the curved surface, the at least two apertures (e.g. at least two slotted apertures) spaced from one another around the radius of the curved surface.

In the second, fully open position each of the apertures may be aligned with a respective one of the radially inner bleed duct openings.

In intermediate position(s), one aperture may be aligned with one of the radially inner bleed duct openings whilst the other is out of alignment with any radially inner bleed duct opening.

The at least one aperture may be a slotted aperture. The or each aperture may be a triangular or oval aperture to modify the air flow through the blocking element. For example, a triangular aperture provides a small change in air flow upon aligning the apex of the triangular aperture with one or other of the bleed ducts (allowing for accurate adjustment) and a much larger change upon aligning the base of the triangular aperture.

In some embodiments, the at least one aperture in the blocking element is dimensioned to be smaller than the cross-sectional area of the plurality of bleed flow paths/radially inner openings e.g. the or each aperture is dimensioned to match or to be smaller than the cross-sectional area of one of the plurality of bleed flow paths/radially inner bleed duct openings.

In a second aspect, the present invention provides a method for bleeding gas from a main gas flow path in a gas turbine engine, said gas bleed arrangement comprising:

providing a gas bleed arrangement according to the first aspect; and moving the blocking element to selectively align the at least one aperture at least partly between the main gas flow path and at least one of the bleed flow paths to control fluid communication between the main gas flow path and the at least one of the bleed flow paths through the aperture.

In some embodiments, the blocking element is moved axially, circumferentially or pivotally to at least partly align the at least one aperture between the main gas flow path and at least one of the bleed flow paths.

In some embodiments, the main blocking portion is dimensioned to completely block the plurality of radially inner bleed duct openings/common duct opening and the method comprises moving the blocking element to a first, fully closed position in which the main blocking portion is completely aligned between the main gas flow path and all of the bleed flow paths so that there is no fluid communication between the main gas flow path and the bleed flow paths.

In some embodiments, the method comprises moving the blocking element from the first, fully closed position with the main blocking portion fully aligned with the radially inner bleed duct openings or the radially inner common duct opening to a second fully open position in which the plurality of bleed ducts are in fluid communication with the main gas flow path.

In some embodiments, the method comprises moving the blocking element (e.g. axially/rotationally or pivotally moving the blocking element) from the first (fully closed) position to the second (fully open) position through at least one intermediate position in which in which only one/some of the bleed duct(s) (but not all) is/are in fluid communication with the main gas flow path.

In some embodiments, the method comprises moving the blocking element to a first intermediate position in which the or one of the at least one apertures is at least partly aligned with one of the radially inner bleed duct openings (whilst the other radially inner bleed duct opening(s) is/are at least partly blocked by the blocking element).

Where the blocking element is annular or a segment of an annulus, the main blocking portion may be axially and/or circumferentially spaced from the secondary blocking portion by the at least one aperture. For example, the main blocking portion may be axially spaced upstream (i.e. towards the gas intake) from the secondary blocking portion by the at least one aperture.

Where the blocking element is an annular/semi-annular blocking element, the method may comprise moving the blocking element to the first, fully closed position such that there is full alignment between the main blocking portion and the radially inner bleed duct openings so that there is no fluid communication between the main gas flow path and the bleed flow paths.

Where the blocking element is an annular/semi-annular blocking element, the method may comprise moving the blocking element to the second, fully open position such that there is substantially no alignment between the main or secondary blocking portions and the bleed flow paths so that there is unimpeded fluid communication between the main gas flow path and the bleed flow paths. For example, the method may comprise moving or retracting (e.g. circumferentially moving or axially retracting) the blocking element out of alignment with the plurality of bleed ducts/radially inner openings.

Where the blocking element is an annular/semi-annular blocking element, the method may comprise moving the blocking element to the second intermediate position(s) such that the secondary blocking portion at least partly blocks at least one of the radially inner bleed duct openings.

Where the blocking element is a pivotable scoop element, the method may comprise moving the scoop element to the first, fully closed position such that the scoop opening is unaligned with the main gas flow path and therefore sealed so that no air from the main gas flow path enters the scoop element.

Where the blocking element is a pivotable scoop element, the method may comprise moving the scoop element to the second, fully open position such that the scoop opening is fully aligned with/fully open to the main gas flow path and therefore air from the main gas flow path freely enters the scoop element.

Where the blocking element is a pivotable scoop element, the method may comprise moving the scoop element to the intermediate position(s) such that the scoop opening is partly aligned with/partly open to the main gas flow path and therefore a reduced flow air from the main gas flow path enters the scoop element.

In a third aspect, the present invention provides a gas turbine engine comprising a bleed arrangement according to the first aspect.

In some embodiments, the annular casing houses at least one compressor and the plurality of bleed ducts extend through the annular casing in the vicinity of/after said at least one compressor.

In some embodiments, one of the plurality of bleed ducts extends to a bypass duct, the bypass duct defining a radially outer bypass gas flow path.

In some embodiments, one of the plurality of bleed ducts extends to a clearance control system.

In some embodiments, one of the plurality of bleed ducts extends from the annular casing to a secondary air cooling system.

BRIEF DESCRIPTION OF THE DRAWINGS

Embodiments of the invention will now be described by way of example with reference to the accompanying drawings in which:

FIG. 2B shows the first embodiment in an intermediate position with a first bleed duct fully open and a second bleed duct partly open;

FIG. 2C shows the first embodiment in an intermediate position with the first bleed duct fully open and the second bleed duct fully closed;

FIG. 2F shows the first embodiment in an intermediate position with the first bleed duct partly open and the second bleed duct partly open;

FIG. 2G shows the first embodiment in an intermediate position with the first bleed duct fully open and the second bleed duct fully closed;

FIG. 3A shows a bleed duct opening and a blocking element in accordance with an embodiment of the invention;

FIG. 3B shows a bleed duct opening and a blocking element in accordance with an embodiment of the invention;

FIG. 3C shows a bleed duct opening and a blocking element in accordance with an embodiment of the invention;

FIG. 3D shows a bleed duct opening and a blocking element in accordance with an embodiment of the invention;

FIG. 3E shows a bleed duct opening and a blocking element in accordance with an embodiment of the invention;

FIG. 4A shows a blocking element in accordance with an embodiment of the invention;

FIG. 4B shows a second embodiment of a gas bleed arrangement in a fully closed position;

FIG. 4C shows the second embodiment in an intermediate position with the first bleed duct fully open and the second bleed duct closed;

DETAILED DESCRIPTION AND FURTHER OPTIONAL FEATURES OF THE INVENTION

FIGS. 2A-2I show a first embodiment of a gas bleed arrangement 1 with a blocking element 2 in various axial positions.

Figure 1:
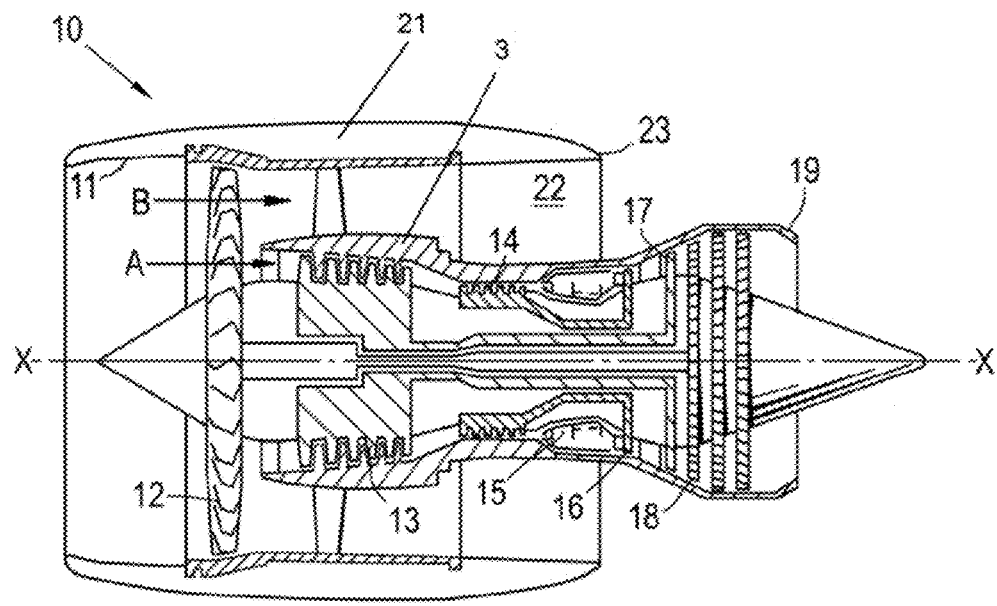
FIG. 1 shows a ducted fan gas turbine engine.

This gas bleed arrangement 1 is provided in the gas turbine engine 10 of FIG. 1 between the intermediate compressor 13 and the high pressure compressor 14.

The gas bleed arrangement 1 comprises an annular casing 3 defining a main gas flow path A. The annular casing 3 includes a first annular bleed duct 4 which defines a first bleed flow path extending from a first radially inner annular slotted bleed duct opening 5 to a clearance control system (not shown) and a second annular bleed duct 6 which defines a second bleed flow path extending from a second radially inner annular slotted bleed duct opening 7 to the bypass duct 22. The radially inner annular slotted bleed duct openings 5, 7 have the same axial dimension and each open into a common duct 27, having a radially inner common duct opening 28.

The blocking element 2 is annular and has a main blocking portion 8 and a secondary blocking portion 9. The main blocking portion 8 is axially spaced downstream of the secondary blocking portion 9 by an annularly-extending slotted aperture 24.

Figure 2A:
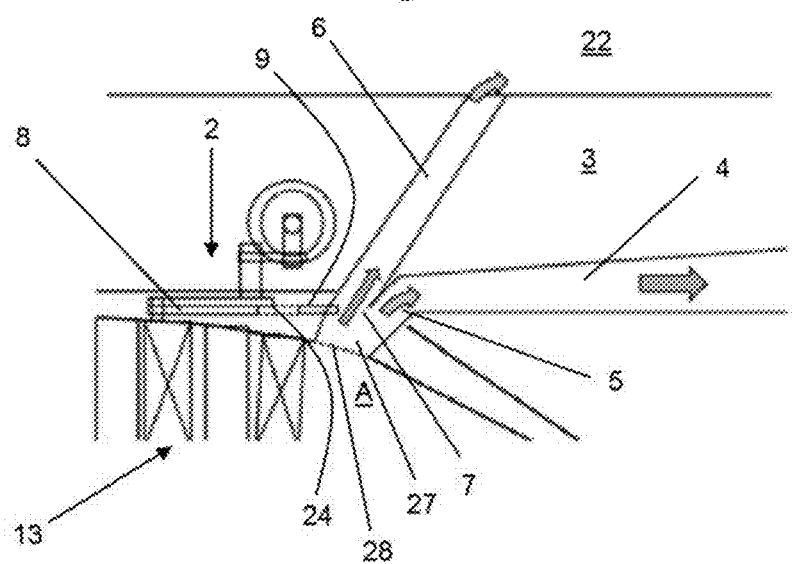
FIG. 2A shows a first embodiment of invention gas bleed arrangement in a fully open position.

FIG. 2A shows the bleed arrangement 1 in a fully open position, in which the blocking element 2 is fully retracted out of alignment with the radially inner bleed duct openings 5, 7 of the first and second bleed ducts 4, 6 so that there is no alignment between the main or secondary blocking portions 8, 9 and the bleed flow paths allowing unimpeded fluid communication between the main gas flow path A and the bleed flow paths in the first and second bleed ducts 4, 6.

FIG. 2B shows the bleed arrangement 1 in an intermediate position where the first bleed duct 4 is fully open (with maximum flow in the first bleed flow path) and the second bleed duct 2 is partially open (with reduced flow in the second bleed flow path). To obtain this intermediate position, the blocking element 2 is moved axially downstream (i.e. away from the air intake) such that the secondary blocking portion is partly aligned with and thus partly blocks the radially inner opening 7 of the second bleed duct. This intermediate position is suitable for high power engine situations when a high flow to the clearance control system and a reduced flow to the bypass duct is required.

FIG. 2C shows the bleed arrangement 1 in an intermediate position where the first bleed duct 4 is fully open (with maximum flow in the first bleed flow path) and the second bleed duct 2 is closed. To obtain this intermediate position, the blocking element 2 is moved further axially downstream (i.e. away from the air intake) such that the secondary blocking portion is aligned with the radially inner opening 7 of the second bleed duct. The secondary blocking portion 9 is dimensioned to match the cross-sectional area of the radially inner opening 7 of the second bleed duct 6 so that it can completely block the second bleed duct 6. This intermediate position is also suitable for high power engine situations when a high flow to the clearance control system and no flow to the bypass duct is required.

Figure 2D:
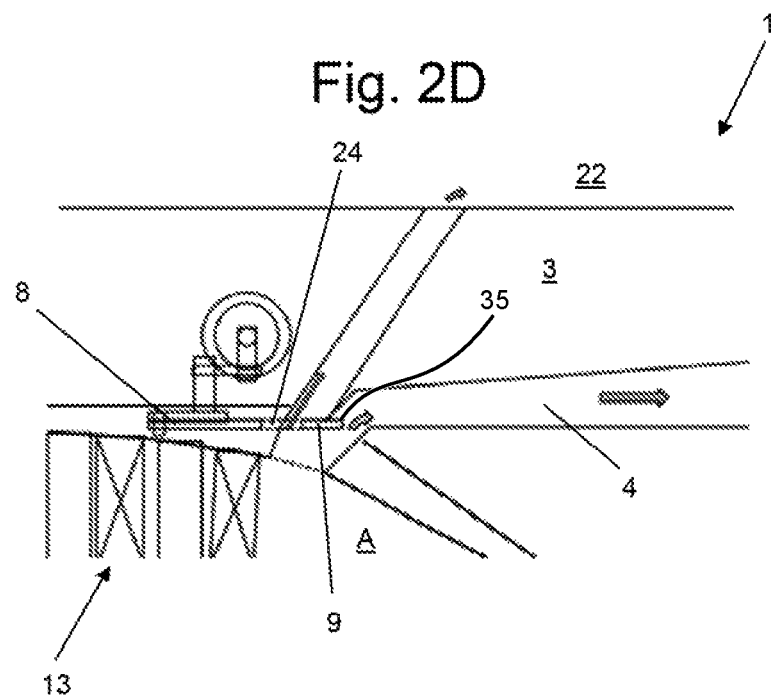
FIG. 2D shows the first embodiment in an intermediate position with the first bleed duct partly open and the second bleed duct partly open.

FIG. 2D shows the bleed arrangement 1 in an intermediate position where the first bleed duct 4 and second bleed duct 6 are both partly open (with reduced flow in the first and second bleed flow paths). To obtain this intermediate position, the blocking element 2 is moved further axially downstream (i.e. away from the air intake) such that the secondary blocking portion is partly aligned with the radially inner opening 7 of the second bleed duct 6 and partly aligned with the radially inner opening 5 of the first bleed duct. Accordingly, the secondary blocking portion 9 partly blocks and thus reduces gas flow in both bleed ducts 4, 6. Gas can flow at a reduced rate into the first bleed duct 4 past the axial downstream end 35 of the secondary blocking portion 9. The aperture 24 is partly aligned with the radially inner opening 7 of the second feed duct 6 and this allows gas flow from the main gas flow path A into the second bleed duct 6 through the aperture 24. This intermediate position is suitable for situations where low engine power occurs at a time when high engine temperature exists (e.g. descent of an aircraft).

Figure 2E:
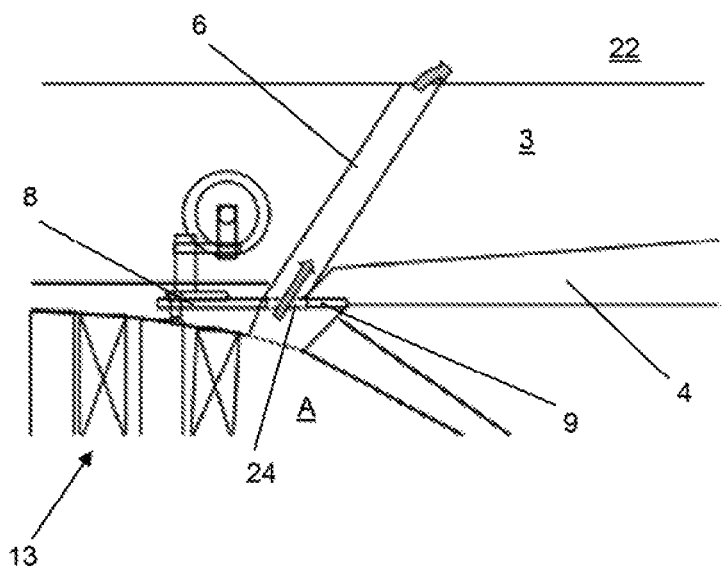
FIG. 2E shows the first embodiment in an intermediate position with the first bleed duct fully closed and the second bleed duct fully open.

FIG. 2E shows the bleed arrangement 1 in an intermediate position where the first bleed duct 4 is fully closed and the second bleed duct 6 is fully open. To obtain this intermediate position, the blocking element 2 is moved further axially downstream (i.e. away from the air intake) such that the secondary blocking portion 9 is fully aligned with the radially inner opening 5 of the first bleed duct 4 and the aperture 24 is fully aligned with the radially inner opening 7 of the second bleed duct 6. The secondary blocking portion 9 is dimensioned to match the cross-sectional area of the radially inner opening 5 of the first bleed duct 4 so that it can completely block the first bleed duct 4. The aperture 24 is dimensioned to match the cross-sectional area of the radially inner opening 7 of the second bleed duct 6 so that there is unimpeded gas flow from the main gas flow path A into the second bleed duct 6. This intermediate position is suitable for situations where engine staling/surge is a risk e.g. during engine start-up.

FIG. 2F shows the bleed arrangement 1 in an intermediate position where the first bleed duct 4 and second bleed duct 6 are both partly open (with reduced flow in the first and second bleed flow paths). To obtain this intermediate position, the blocking element 2 is moved further axially downstream (i.e. away from the air intake) such that the secondary blocking portion is partly aligned with the radially inner opening 5 of the first bleed duct 4, the main blocking portion 8 is partly aligned with the radially inner opening of the radially inner opening 7 of the second bleed duct and the aperture is partly aligned with both radially inner openings 5, 7. Accordingly, the secondary blocking portion 9 partly blocks and thus reduces gas flow in the first bleed duct 4 and the main blocking portion 8 partly blocks and thus reduces gas flow in the second bleed duct 6. Gas can flow at a reduced rate into the first bleed duct 4 and second bleed duct 6 through the aperture 24. This intermediate position is suitable for situations where low engine power occurs at a time when high engine temperature exists (e.g. descent of an aircraft).

FIG. 2G shows the bleed arrangement 1 in an intermediate position where the first bleed duct 4 is fully open (with maximum flow in the first bleed flow path) and the second bleed duct 2 is closed. To obtain this intermediate position, the blocking element 2 is moved further axially downstream (i.e. away from the air intake) such that the main blocking portion is aligned with and completely blocks the radially inner opening 7 of the second bleed duct 6 and the aperture 24 is fully aligned with the radially inner opening 5 of the first bleed duct 4 and thus allows impeded gas flow into the first bleed duct 4. This intermediate position is also suitable for high power engine situations when a high flow to the clearance control system and no flow to the bypass duct is required.

Figure 2H:
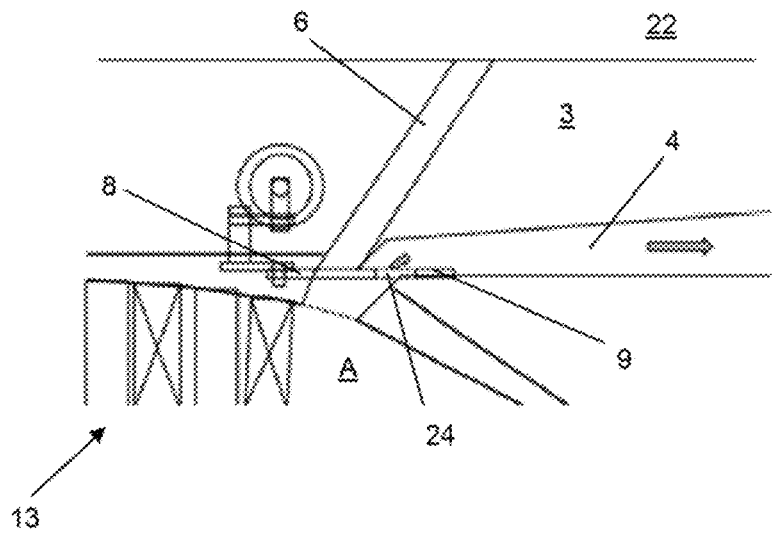
FIG. 2H shows the first embodiment in an intermediate position with the first bleed duct partly open and the second bleed duct fully closed.

FIG. 2H shows the bleed arrangement 1 in an intermediate position where the first bleed duct 4 is partly open (with reduced flow in the first bleed flow path) and the second bleed duct 2 is closed. To obtain this intermediate position, the blocking element 2 is moved further axially downstream (i.e. away from the air intake) such that the main blocking portion 8 is completely aligned with and completely blocks the radially inner opening 7 of the second bleed duct 6 and partly aligned with and partly blocks the radially inner opening 5 of the first bleed duct 4. The aperture 24 is partly aligned with the radially inner opening 5 of the first bleed duct 4 and thus allows reduced gas flow into the first bleed duct 4. This intermediate position is suitable for situations such as aircraft climb and cruise conditions.

Figure 2I:
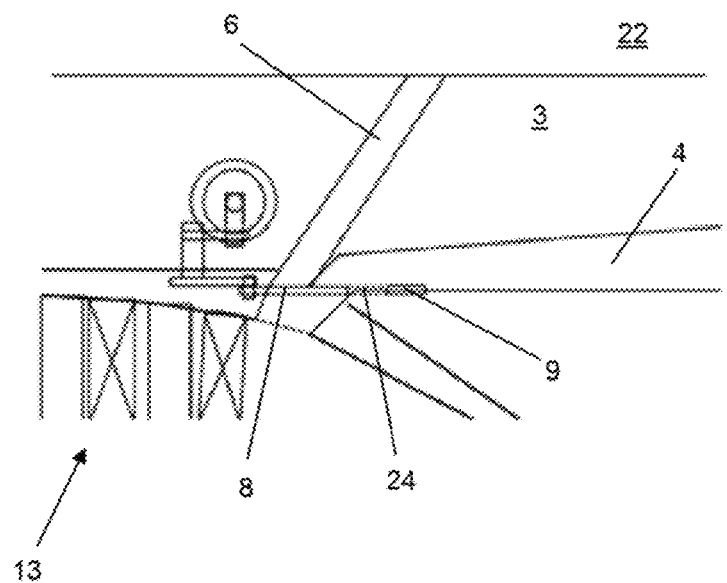
FIG. 2I shows the first embodiment in a fully closed position.

Finally, FIG. 2I shows the bleed arrangement 1 in a fully closed position where both the first bleed duct 4 and second bleed duct 600 are completely blocked by the main blocking portion 8. To obtain this intermediate position, the blocking element 2 is moved to its furthest axially downstream position (i.e. away from the air intake). This position may be used at higher power conditions to prevent flow to the clearance control system prior to a steep climb when the clearance control system is turned off to accommodate impending rotor growth.

FIGS. 3A-3E show schematically how the shape of the aperture 24 can be used to control the rate of flow of air from the main gas flow path A into the bleed ducts 4, 6.

FIG. 3A shows a bleed duct opening 5 and a blocking element 2 where there is no overlap between the aperture 24 and the bleed duct opening 5 i.e. the bleed duct 5 is closed.

The aperture has a triangular section 29 at a down-stream position.

As the blocking element moves axially, the apex 30 of the triangular section 29 first overlaps the bleed duct opening 5 as shown in FIG. 3C and the movement creates a relatively small change in flow from the main gas flow path into the bleed duct owing to the small area of overlap between the aperture 24 and the bleed duct opening 5.

As shown in FIG. 3D, further movement of the blocking element 2 causes overlap of the larger rectangular section of the aperture 24 so that the same amount of movement gives a much larger increase in flow rate.

Finally, once the bleed duct is fully open, as shown in FIG. 3E, the bleed duct opening 5 and the aperture 24 are coincident.

FIGS. 4A-4E show a second embodiment of a gas bleed arrangement 1 with a blocking element 2 in various positions.

The gas bleed arrangement 1 comprises an annular casing 3 defining a main gas flow path A. The annular casing 3 includes a first annular bleed duct 4 which defines a first bleed flow path extending from a first radially inner annular slotted bleed duct opening 5 to a clearance control system (not shown) and a second annular bleed duct 6 which defines a second bleed flow path extending from a second radially inner annular slotted bleed duct opening 7 to the bypass duct 22. The radially inner blind duct openings 5, 7 have the same axial dimension and each open into a common duct 27, having a radially inner common duct opening 28.

As shown in FIG. 4A, the blocking element 2 is a pivotable scoop element and has a scoop opening 25, a main blocking portion 8 and a curved surface 26 opposing the scoop opening 25. The curved surface 26 comprises two slotted apertures 24 24' radially spaced around the curved surface.

FIG. 4B shows the bleed arrangement 1 in a fully closed position in which the main blocking portion 8 is fully aligned with and completely blocks the radially inner common duct opening 28. The scoop opening 25 is out of alignment with and therefore sealed from the main gas flow path A. Accordingly, there is no fluid communication and no gas flow from the main gas flow path A into the bleed ducts 4, 6.

FIG. 4C shows an intermediate position in which the first bleed duct 4 is fully open and the second bleed duct 6 is closed. In this position, the blocking element 2 has been pivoted so that the main blocking portion 8 no longer blocks the radially inner common duct opening 29. The scoop opening is partly aligned with the main gas flow path A so that gas enters the scoop opening and flows into the first bleed duct 4 through the aperture 24' which is fully aligned with the radially inner first bleed duct opening 5.

Figure 4D:
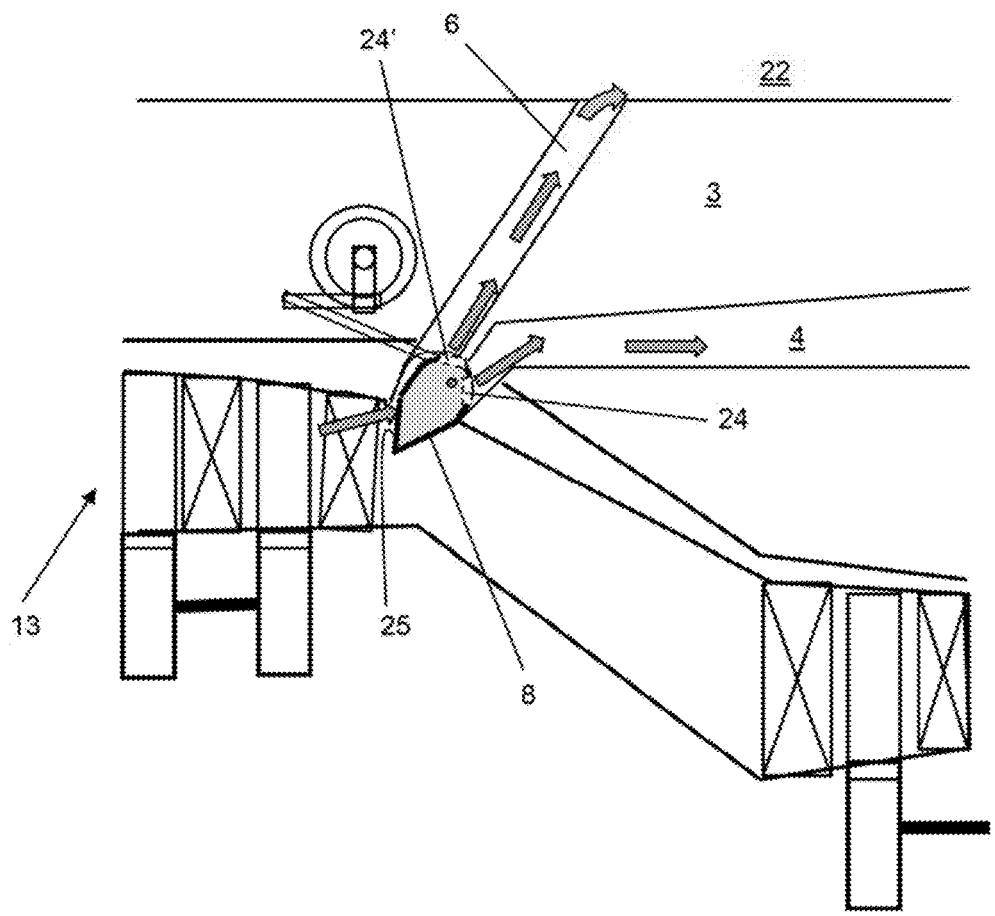
FIG. 4D shows the second embodiment in a fully open position.

FIG. 4D shows the bleed arrangement 1 in a fully open position in which radially inner common duct opening 28 is unblocked by the main blocking portion 8 and the scoop opening 25 is aligned with the main gas flow path A. The two apertures 24 and 24' are aligned with the two radially inner bled duct openings 7, 5. Accordingly, there is fluid communication between the main gas flow path A and both of the bleed ducts 4, 6.

Figure 4E:
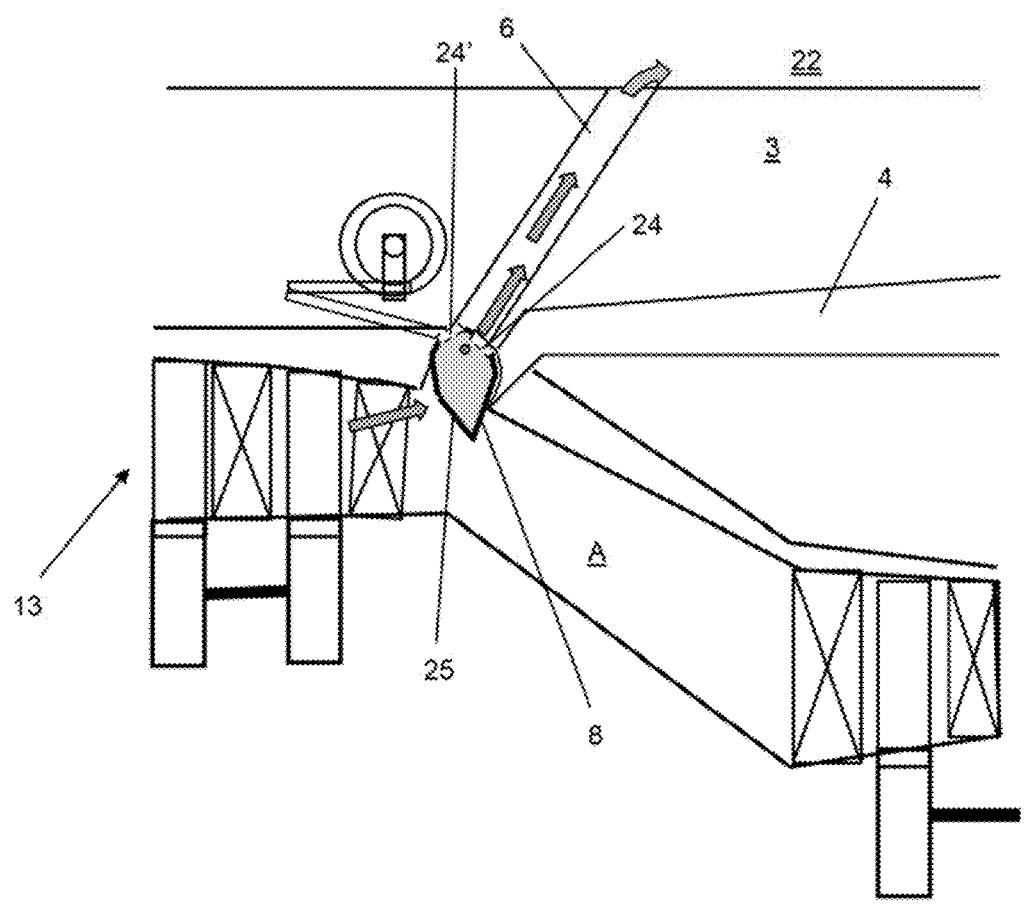
FIG. 4E shows the second embodiment in an intermediate position with the second bleed duct fully open and the first bleed duct closed.

FIG. 4E shows a further intermediate position in which the second bleed duct 6 is fully open and the first bleed duct 6 is closed. In this position, the blocking element 2 has been pivoted further so that the main blocking portion 8 now blocks the radially inner first bleed duct opening 5 and the scoop opening 25 is fully aligned with the main gas flow path A. Gas enters the scoop opening 25 and flows into the second bleed duct 6 through the aperture 24 which is fully aligned with the radially inner second bleed duct opening 7.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A gas bleed arrangement for a gas turbine engine, said gas bleed arrangement comprising:
   an annular casing defining a main gas flow path, said annular casing having a plurality of bleed ducts each defining a respective bleed flow path, the arrangement further including a plurality of radially inner bleed duct openings, wherein each one of the plurality of bleed ducts extends from a corresponding one of the plurality of radially inner bleed duct openings, and wherein the plurality of radially inner bleed duct openings open into a common duct extending from a radially inner common duct opening through the annular casing from the main gas flow path to the bleed flow paths/ducts; and
   a blocking element having at least one aperture, wherein the blocking element is annular or a segment of an annulus, and
   wherein the blocking element is arranged to be slideable within the common duct to align the at least one aperture at least partly between the main gas flow path and at least one of the plurality of bleed flow paths to control fluid communication between the main gas flow path and the at least one of the bleed flow paths through the at least one aperture.

2. An arrangement according to claim 1 wherein the blocking element is axially moveable.

3. An arrangement according to claim 1 wherein the blocking element comprises a main blocking portion dimensioned to fully block the plurality of radially inner bleed duct openings or to fully block the radially inner common duct opening.

4. An arrangement according to claim 3 wherein, in a first, fully closed position, the main blocking portion is completely aligned with the plurality of radially inner bleed duct openings or with the radially inner common duct opening.

5. An arrangement according to claim 4 wherein the blocking element is slideable to move the blocking element from the first, fully closed position to a second fully open position in which the plurality of bleed ducts are in fluid communication with the main gas flow path.

6. An arrangement according to claim 5 wherein the blocking element is slideable from the first position to the second position through at least one intermediate position in which only one/some of the bleed duct(s) but not all is/are in fluid communication with the main gas flow path.

7. An arrangement according to claim 6 wherein, in a first intermediate position, the or one of the at least one apertures is at least partly aligned with one of the plurality of radially inner bleed duct openings.

8. An arrangement according to claim 3 wherein the blocking element comprises the main blocking portion and a secondary blocking portion, the main and secondary blocking portions being spaced by the at least one aperture.

9. An arrangement according to claim 8 wherein the secondary blocking portion is dimensioned to be smaller than a cross-sectional area of the plurality of bleed ducts.

10. An arrangement according to claim 9 wherein the secondary blocking portion is dimensioned to match the cross-sectional area of one of the plurality of bleed flow paths/radially inner openings.

11. An arrangement according to claim 8 wherein the main blocking portion is axially and/or circumferentially spaced from the secondary blocking portion by the at least one aperture.

12. A gas turbine engine comprising a bleed arrangement according to claim 1.

13. A method for bleeding gas from a main gas flow path in a gas turbine engine, said gas bleed arrangement comprising:
providing a gas bleed arrangement according to claim 1; and
sliding the blocking element to selectively align the at least one aperture at least partly between the main gas flow path and at least one of the plurality of bleed flow paths to control fluid communication between the main gas flow path and the at least one of the plurality of bleed flow paths through the at least one aperture.

14. A method according to claim 13 wherein the blocking element includes a main blocking portion that is dimensioned to completely block the plurality of radially inner bleed duct openings/common duct opening and the method comprises sliding the blocking element to a first, fully closed position in which the main blocking portion is completely aligned between the main gas flow path and the plurality of bleed flow paths.

15. A method according to claim 14 comprising sliding the blocking element from the first, fully closed position to a second fully open position in which the plurality of bleed ducts are in fluid communication with the main gas flow path.

16. A method according to claim 15 comprising sliding the blocking element from the first position to the second position through at least one intermediate position in which in which only one/some of the plurality of bleed duct(s) is/are in fluid communication with the main gas flow path.

17. A gas bleed arrangement for a gas turbine engine, said gas bleed arrangement comprising:
an annular casing defining a main gas flow path, said annular casing having a plurality of bleed ducts each defining a respective bleed flow path, at least two of the plurality of bleed ducts being arranged to be adjacent in a radial direction with respect to the annular casing, the arrangement further including a plurality of radially inner bleed duct openings, wherein each one of the at least two radially adjacent bleed ducts extends from a corresponding one of the plurality of radially inner bleed duct openings, and wherein each of the corresponding ones of the plurality of radially inner bleed duct openings open into a common duct extending from a radially inner common duct opening through the annular casing from the main gas flow path to the bleed flow paths/ducts; and
a blocking element having at least one aperture,
wherein the blocking element is a scoop element having a scoop opening which is alignable with the main gas flow path, a main blocking portion extending to a curved surface opposite the scoop opening, the curved surface comprising the at least one aperture, and
wherein the blocking element is rotatable or pivotable to align the at least one aperture at least partly between the main gas flow path and at least one of the at least two bleed flow paths to control fluid communication between the main gas flow path and the at least one of the at least two radially adjacent bleed flow paths through the at least one aperture.

18. An arrangement according to claim 17 comprising at least two apertures in the curved surface, the at least two apertures spaced from one another around the radius of the curved surface.

19. A method for bleeding gas from a main gas flow path in a gas turbine engine, said gas bleed arrangement comprising:
providing a gas bleed arrangement according to claim 17; and
rotating or pivoting the blocking element to selectively align the at least one aperture at least partly between the main gas flow path and at least one of the at least two radially adjacent bleed flow paths to control fluid communication between the main gas flow path and the at least one of the at least two radially adjacent bleed flow paths through the at least one aperture.

20. A gas turbine engine comprising a bleed arrangement according to claim 17.

* * * * *